(12) United States Patent
Alonso Tabares

(10) Patent No.: US 10,260,932 B2
(45) Date of Patent: Apr. 16, 2019

(54) WEIGHING DEVICE AND SYSTEM FOR DETERMINING THE WEIGHT AND THE CENTER OF GRAVITY OF AN AIRCRAFT

(71) Applicant: AIRBUS SAS, Blagnac (FR)

(72) Inventor: Diego Alonso Tabares, Toulouse (FR)

(73) Assignee: AIRBUS SAS (FR)

( * ) Notice: Subject to any disclaimer, the term of this patent is extended or adjusted under 35 U.S.C. 154(b) by 120 days.

(21) Appl. No.: 15/609,076

(22) Filed: May 31, 2017

(65) Prior Publication Data

US 2017/0350749 A1 Dec. 7, 2017

(30) Foreign Application Priority Data

Jun. 3, 2016 (FR) ..................................... 16 55066

(51) Int. Cl.
  *G01G 19/07* (2006.01)
  *G01M 1/12* (2006.01)
  *G01G 19/02* (2006.01)
  *G01G 19/414* (2006.01)

(52) U.S. Cl.
  CPC ........... *G01G 19/07* (2013.01); *G01G 19/024* (2013.01); *G01G 19/414* (2013.01); *G01M 1/125* (2013.01); *G01G 19/022* (2013.01)

(58) Field of Classification Search
  CPC .... G01G 19/07; G01G 19/414; G01G 19/024; G01G 19/022; G01G 23/3728; G01G 23/3735; G01G 23/3742; G01M 1/125
  USPC ........................................ 177/140, 199, 200
  See application file for complete search history.

(56) References Cited

U.S. PATENT DOCUMENTS

| | | | | |
|---|---|---|---|---|
| 5,086,856 A | * | 2/1992 | Haggstrom | G01G 19/445 177/1 |
| 6,717,072 B1 | * | 4/2004 | Winterberg | G01G 19/445 177/126 |
| 2006/0158337 A1 | * | 7/2006 | Cohen | A61B 5/7475 340/666 |
| 2010/0057592 A1 | * | 3/2010 | Moir | G01G 23/3735 705/29 |
| 2017/0057663 A1 | * | 3/2017 | Alonso Tabares | G05D 1/0011 |

FOREIGN PATENT DOCUMENTS

| | | |
|---|---|---|
| DE | 10 2005 018279 A1 | 10/2006 |
| EP | 3367076 A1 * | 8/2018 ............. G01G 19/07 |

OTHER PUBLICATIONS

Computer Translation of EP 10 2005 018279 A1 from the EPO website, downloaded Nov. 19, 2018.*

(Continued)

*Primary Examiner* — Randy W Gibson
(74) *Attorney, Agent, or Firm* — Lerner, David, Littenberg, Krumholz & Mentlik, LLP

(57) ABSTRACT

A device for weighing aircraft includes a weighing platform configured to receive a undercarriage leg of the aircraft and to generate weighing signals, a first calculation unit configured to calculate weighing information from the weighing signals generated by the weighing platform, a communication unit configured to transmit to a central device and to receive signals including at least one signal representing the weighing information calculated by the calculation unit, and a ground rolling unit configured to move the weighing platform over a surface.

15 Claims, 3 Drawing Sheets

(56) References Cited

OTHER PUBLICATIONS

Search Report dated Jan. 30, 2017 (FR 16 55066).
Ron Alexander, "Weight & Balance: Weighing and Measuring Your Safety," EAA Sport Aviation (Mar. 2001), URL: http://www.eaa.org/en/eaa/aviation-communities-and-interests/homebuilt-aircraft-and-homebuilt-aircraft-kits/resources-for-while-youre-building/building-articles/weight-and-balance/weight-and-balance [extrait le Jan. 30, 2017].

* cited by examiner

WEIGHING DEVICE AND SYSTEM FOR DETERMINING THE WEIGHT AND THE CENTER OF GRAVITY OF AN AIRCRAFT

FIELD OF THE INVENTION

The present invention concerns a weighing device and a system for determining the weight and the center of gravity of an aircraft comprising a plurality of these weighing devices.

BACKGROUND OF THE INVENTION

The accurate weighing of an aircraft is generally effected during maintenance operations. Maintenance operations commonly take place in a hangar or in a closed installation, after the aircraft has been positioned on a chocking device. This chocking device includes in particular a set of chocks and there is a minimum distance (which can be equal to zero) that must be complied with between each of the chocks and a undercarriage leg of the aircraft.

The weight used for the operational distribution of an aircraft or for performance calculations is a combination of measurements, estimates and calculations on the basis of:
  the operating empty weight (OEW) of the aircraft, obtained by averaging a sample of measurements for all the aircraft of a fleet,
  the payload, based on estimates of the weight of the passengers and carry-on baggage and baggage in the hold together with the weight of the freight,
  the fuel, the weight of which is measured in the fuel bowser and/or in the aircraft.

The sum of the masses listed above enables an estimate to be obtained of the take-off weight (TOW). However, this estimated weight is not the real weight. This weight is used in the calculation of parameters of the aircraft. In particular, the center of gravity of the aircraft is calculated on the basis of this estimate.

The document FR 2 914 416 describes a system for determining the weight and the center of gravity of an aircraft in service at an airport. That system comprises weighing means embedded in the ground and disposed at a location the aircraft travels over, such as a taxiway leading to the runway. The aircraft is weighed when its undercarriage legs pass over the weighing means.

However, embedding the weighing means in the ground limits the use of the system to certain aircraft configurations.

BRIEF SUMMARY OF THE INVENTION

An aspect of the present invention may alleviate this disadvantage by making it possible to measure precisely the weight and the center of gravity of an aircraft in service whatever its configuration.

To this end, the invention concerns a device for weighing aircraft,

According to an embodiment of the invention the device comprises:
  a weighing platform configured to receive a undercarriage leg of the aircraft and to generate weighing signals,
  a first calculation unit configured to calculate weighing information from the weighing signals generated by the weighing platform,
  a first communication unit configured to transmit to a central device and to receive signals including at least one signal representing the weighing information calculated by the first calculation unit,
  a ground rolling unit configured to move the weighing platform over a surface.

Thus, thanks to the ground rolling unit, the weighing device can be moved in order to be positioned at different locations that are notably accessible to a undercarriage leg of an aircraft. This mobile weighing device can be used to measure accurately the weight and the center of gravity of an aircraft as explained above.

According to one feature, the ground rolling unit comprises:
  at least one driving and steerable wheel adapted to be driven by a motor module and to be steered by a steering module,
  at least one driven wheel,
  the first communication unit being configured to receive from a control module control signals for controlling the ground rolling unit.

The device advantageously comprises a chocking unit configured to chock the undercarriage leg of the aircraft on the weighing platform when the weighing device is positioned at the level of the undercarriage leg, the chocking unit comprising:
  a pair of chocks,
  a module for actuating the pair of chocks configured to control the movements of the pair of chocks so that the undercarriage leg of the aircraft is chocked between the chocks,
  the first communication unit being configured to receive from a control module control signals for controlling the module for actuating the pair of chocks, the first communication unit being also configured to send a chocking confirmation signal when the aircraft is chocked by the pair of chocks.

Moreover, the device further comprises a set of foldable ramps configured to allow access of the undercarriage leg of the aircraft to the weighing platform, the set of foldable ramps being also configured to allow the undercarriage leg of the aircraft to exit the weighing platform.

The weighing platform advantageously comprises a matrix of load cells, each load cell being configured to generate and to transmit a weighing signal to the first calculation unit configured to calculate the weighing information.

Moreover, the device further comprises at least one imaging unit, each imaging unit being configured to generate a video signal representing an image, the first communication unit being adapted to send video signals representing the image generated by each imaging unit.

Moreover, the device further comprises a positioning unit configured to generate signals representing the position of the weighing device, the first communication unit being adapted to send signals representing the position of the weighing device.

The device optionally further comprises a unit for determining environmental parameters able to generate signals representing the environmental parameters of the position where the weighing device is liable to be located, the environmental parameter determination unit being configured to transmit to the first calculation unit the signals representing the environmental parameters, the first calculation unit incorporating these signals into the calculation of the weighing information.

The device advantageously further comprises a control module, said control module comprising:
  a first input unit configured to generate control signals from controlling the ground rolling unit of the weighing device, a second input unit configured to generate control signals for controlling the module for actuating the pair of chocks of the weighing device, a first display unit configured to display the position of the weighing device on the basis of the signals representing the position of the weighing device sent by the first communication unit, a second communication unit configured to send the control signals for controlling the ground rolling unit and the control signals for controlling the module for actuating the pair of chocks and configured to receive the signals representing the position of the weighing device.

Thanks to the control module, the weighing devices can therefore be disposed relative to one another in accordance with a configuration corresponding to the positions of the undercarriage legs of the aircraft.

Moreover, the weighing device comprises a second display unit configured to display video images on the basis of the video signals representing an image generated by the imaging unit or units of the weighing device.

The invention also concerns a system for determining the weight and the center of gravity of an aircraft.

The system according to an embodiment of the invention comprises:
at least one weighing device as described above,
a central device configured to determine the weight of the aircraft and the position of the center of gravity of the aircraft, and
a user device configured to receive a signal representing the weight of the aircraft and a signal representing the position of the center of gravity of the aircraft.

According to one particular feature, the central device comprises:
a memory storing a database listing aircraft dimensional characteristics,
a second calculation unit configured to calculate the weight and a position of the center of gravity of the aircraft on the basis of, on the one hand, weighing information transmitted by each weighing device and, on the other hand, dimensional characteristics of the aircraft extracted from the database,
a third communication unit configured to transmit to the user device a signal representing the weight of the aircraft and a signal representing the position of the center of gravity of the aircraft calculated by the second calculation unit.

The user device comprises:
a fourth communication unit of the aircraft configured to receive a chocking confirmation signal, a signal representing the weight of the aircraft and a signal representing the position of the center of gravity of the aircraft,
a third display unit of the aircraft configured to display the weight of the aircraft and the center of gravity of the aircraft on the basis of the signal representing the weight of the aircraft and the signal representing the position of the center of gravity of the aircraft transmitted by the third communication unit,
a fourth display unit of the aircraft configured to display a confirmation of the chocking of the aircraft on the basis of the chocking confirmation signal sent by a first communication unit of a weighing device.

The invention also concerns a method of using the system for determining the weight and the center of gravity of an aircraft as described above.

According to the invention, the method comprises:
a step of pre-positioning weighing devices at a location where the aircraft is intended to stop, the number of weighing devices having been defined beforehand on the basis of the number of undercarriage legs to be used to measure the weight,
a step of final positioning of the weighing devices with the aid of a ground rolling unit of each weighing device controlled by a control module according to positions corresponding to the positions of the undercarriage legs of the aircraft,
a step of rolling the aircraft onto the weighing devices,
a step of weighing the aircraft on weighing platforms of the weighing devices,
a step of determination of the weight and the position of the center of gravity of the aircraft by a central device,
a step of transmission to a user device of a signal representing the weight of the aircraft and a signal representing the position of the center of gravity of the aircraft,
a step of displaying on a display unit of the user device the weight of the aircraft and the position of the center of gravity of the aircraft.

Moreover, the step of determining the weight and the position of the center of gravity is preceded by a step of chocking the undercarriage legs of the aircraft on at least one weighing platform.

Moreover, the step of final positioning of the weighing devices is preceded by a step of reception by the control module of a signal representing the position of the undercarriage legs of the aircraft.

BRIEF DESCRIPTION OF THE DRAWINGS

The invention, its features and its advantages emerge more clearly on reading the description given with reference to the appended drawings, in which.

DETAILED DESCRIPTION

Figure 1:
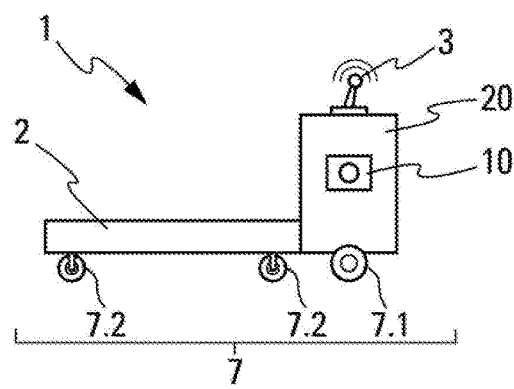
FIG. 1 is a side view of a first embodiment the weighing device.
Figure 2:
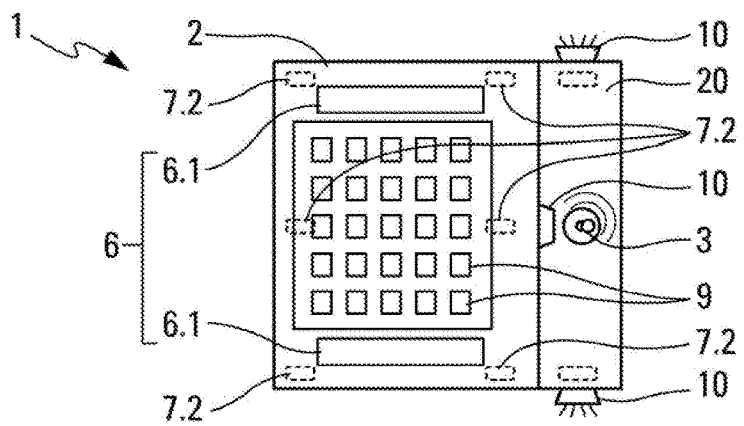
FIG. 2 is a top view of the weighing device.

The remainder of the description refers to the figures cited above.

The device used to illustrate an embodiment of the invention and shown in FIGS. 1 to 4 is a device 1 for weighing an aircraft AC, notably a transport aircraft.

Throughout the description the term "horizontal" refers to a direction parallel to the longitudinal axis of the aircraft AC, the term "lateral" refers to a direction parallel to the surface of the ground and perpendicular to the longitudinal axis of the aircraft AC, and the term "vertical" refers to a direction perpendicular to the surface of the ground and to the longitudinal axis of the aircraft AC.

A first embodiment of the weighing device 1 comprises:
- a weighing platform 2 configured to receive an undercarriage leg 5 of the aircraft AC and to generate weighing signals,
- a ground rolling unit 7 configured to move the weighing platform 2 over a surface,
- a calculation unit 4 configured to calculate weighing information from weighing signals generated by the weighing platform 2, and
- a communication unit 3 configured to send and to receive signals including at least one signal representing the weighing information calculated by the calculation unit 4.

For example, the calculation unit 4 and the communication unit 3 are integrated into a cabinet 20 fixed to the weighing platform 2.

According to one variant, the communication unit 3 comprises an antenna fixed to the cabinet 20.

According to one variant, the weighing device 1 comprises a set of foldable ramps 8 to allow access of a landing gear 5 of the aircraft AC to the weighing platform 2. The set of foldable ramps 8 also enables the undercarriage leg 5 of the aircraft AC to exit the weighing platform 2.

For example, each ramp 8 comprises an inclined plane a first end of which is configured to be placed on a taxiway of the aircraft AC and a second end of which, opposite the first end, is disposed at the level of the weighing platform 2. According to one variant, each ramp 8 is fixed in rotation by the second edge to enable the deposition of each ramp 8 on the weighing platform 2 in a folded state of the weighing device 1. According to one configuration, an actuator module (not shown) is adapted to control the folding and unfolding of each ramp 8.

The weighing device 1 advantageously comprises a chocking unit 6 configured to chock the undercarriage leg 5 of the aircraft AC on the weighing platform 2 when the weighing device 1 is positioned under the undercarriage leg 5.

Figure 3:
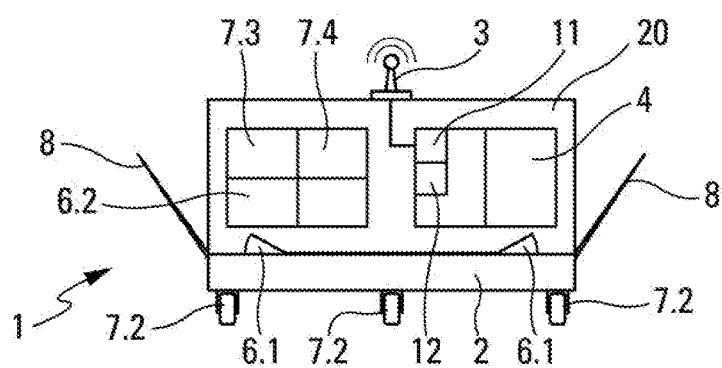
FIG. 3 is a side view of the weighing device.

As shown in FIG. 3, the chocking unit 6 comprises a pair of chocks 6.1 and a module 6.2 for actuating the pair of chocks 6.1 configured to control the movements of the pair of chocks 6.1 in order for the undercarriage leg 5 of the aircraft AC to be chocked between the chocks 6.1 in accordance with the chocking procedure defined by the airline owning the aircraft and/or the airport where the weighing measurement is carried out.

For example, there is a chock 6.1 on each side of the weighing platform 2.

A chock 6.1 has the shape of a sector of a cylinder, for example. This chock 6.1 therefore has a cross-section the shape of a circular sector. This circular sector is delimited by two radii at an angle to each other and a circular arc. One of the radii of the circular sector defines a bearing surface configured to receive an undercarriage leg 5 to be chocked.

The actuating module 6.2 controls the angle between the radii defining the bearing surface and the surface of the weighing platform 2.

According to another variant embodiment, the chock 6.1 has a cross-section of triangular shape or any other shape suitable for chocking the undercarriage leg 5 of an aircraft AC.

The actuating module 6.2 controls vertical movement of the chocks 6.1 and in particular a height to which the chocks 6.1 are deployed above the platform 2. The actuating module 6.2 therefore makes it possible to deploy or to retract the pair of chocks 6.1 of the platform 2.

According to a variant, the actuating module 6.2 also controls lateral and longitudinal movement of at least one chock 6.1. For example, this actuating module comprises a lead screw driven by a motor and controlled by the actuating module 6.2.

The communication unit 3 preferably sends a chocking confirmation signal when the aircraft AC is chocked by the pair of chocks 6.1.

According to one variant, depending on the aircraft AC to be chocked, the communication unit 3 sends a chocking confirmation signal when the height of a chock 6.1 above the surface of the weighing platform 2 corresponds to a reference height depending on the aircraft AC.

According to another variant, the bearing surface of at least one chock 6.1 comprises a sensor (not shown) configured to detect the contact of the undercarriage leg 5 with the sensor. When contact with the undercarriage leg 5 is detected by the sensor, the sensor transmits a signal to the communication unit 3. According to this variant, the sensor is also configured to detect the end of contact between the chock 6.1 and the undercarriage leg (at the end of a weighing operation) and to transmit a chocking exit signal to the communication unit 3.

According to each of the variants, the communication unit 3 transmits the chocking confirmation signal or the chocking exit signal to a display unit 17 of the aircraft AC.

According to another variant, the connection between the weighing platform 2 and the cabinet 20 comprises a sliding connection allowing movement of the weighing platform 2 relative to the cabinet 20.

According to one variant, the weighing platform 2 comprises a matrix of load cells 9. Each load cell 9 generates and transmits a weighing signal to the calculation unit 4 configured to calculate the weighing information. The calculation unit 4 determines the weighing information from the weighing signals transmitted by each load cell 9.

For example, the load cells 9 consist of fiber optic load cells.

The weighing platform 2 optionally comprises a sensor (not shown) configured to measure the pressure of the tires of the undercarriage leg 5.

The weighing device 1 advantageously also comprises a unit 12 for determining environmental parameters. The environmental parameter determination unit 12 is able to generate signals representing the environmental parameters of the geographical position where the weighing device 1 is liable to be located.

For example, the environmental parameters consist of parameters liable to influence the accuracy of the measurements produced by the platform 2 for weighing the aircraft. These parameters can be meteorological parameters such as the wind speed and/or direction or precipitation. They can equally be geographical parameters such as the inclination on the surface on which the weighing device 1 is disposed and/or the gravitational acceleration. They can also be parameters depending on the type of aircraft AC, such as the dimensions of the aircraft AC and/or the footprint on the ground of each undercarriage leg 5 of the aircraft AC. The parameters depending on the type of aircraft AC can be transmitted by an air traffic control center (ATCC) or by the aircraft AC the weight and the center of gravity which are determined.

The environmental parameter determination unit 12 is configured to transmit to the calculation unit 4 the signals representing the environmental parameters. The first calculation unit 4 incorporates these signals into the calculation of the weighing information.

An accuracy of 1% can therefore be achieved in the calculation of the weight of the aircraft AC and of the position of its center of gravity.

The weighing device 1 optionally comprises a ventilation unit (not shown) for ventilating the brake or brakes of the undercarriage leg 5.

The weighing device 1 preferably also comprises a radio frequency identification (RFID) unit such as an RFID tag. The tag (not shown) comprises a memory containing information on the aircraft AC and/or information on the type of tires with which the undercarriage leg 5 is equipped. The RFID unit (not shown) is configured to read the RFID tag in order to recover the information that it contains.

The environmental parameter determination unit 12, the ventilation unit or the radio-frequency identification unit are contained in the cabinet 20, for example.

The weighing device 1 comprises a memory space (not shown) configured to store the weighing information calculated by the calculation unit 4. The memory space is contained in the cabinet 20, for example.

The ground rolling unit 7 advantageously comprises wheels enabling the weighing device 1 to be moved.

According to the first embodiment, the weighing device 1 is positioned manually in front of a undercarriage leg 5 using the ground rolling unit 7. The undercarriage leg 5 is next positioned on the weighing platform 2.

Figure 4:
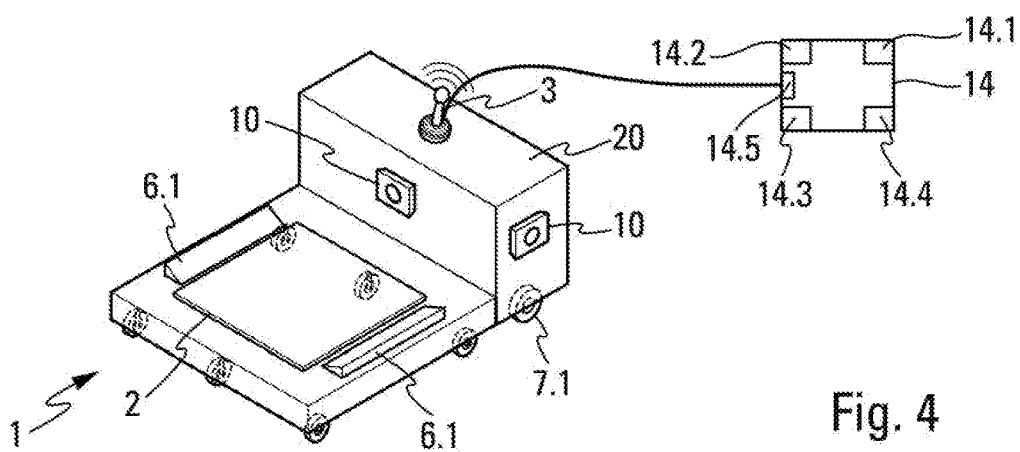
FIG. 4 is a perspective view of a second embodiment of the weighing device.

According to a second embodiment shown in FIG. 4, the weighing device 1 also comprises a control module 14 configured to control movement of each weighing device 1 and in particular enabling remote control of the ground rolling unit 7 and the module 6.2 for actuating the pair of chocks 6.1.

In this second embodiment the ground rolling unit 7 comprises at least one driving and steerable wheel 7.1 and at least one driven wheel 7.2. The driving and steerable wheel 7.1 is driven by a motor module 7.3 and is steered by a steering module 7.4. According to one variant, the motor module 7.3 and the steering module 7.4 are integrated into said cabinet 20.

According to one variant, the ground rolling unit 7 comprises three driving and steerable wheels 7.1 and six driven wheels 7.2 regularly distributed under the weighing device 1. The number of driving and steerable wheels 7.1 and the number of driven wheels 7.2 generally depend on the dimensions of the weighing platform 2. The dimensions of the weighing platform 2 are matched to the dimensions of the undercarriage leg and therefore to the type of aircraft AC (medium haul, long haul, wide-bodied).

By way of example, the motor module 7.3 comprises an electric motor and a battery configured to supply power to that electric motor.

According to one variant, the ground rolling unit 7 also comprises a braking module (not shown) for stopping the weighing device 2 moving.

In one particular variant, the driving and steerable wheels 7.1 are fixed and distributed under the cabinet 20.

The weighing device 1 advantageously comprises a unit (not shown) for damping the weighing platform 2 in order to absorb the increase in pressure caused by the undercarriage leg bearing on the weighing device 1.

According to one variant, a damping unit equips each of the driven wheels 7.2 and is coupled to a unit for retracting the driven wheel 7.2. This retraction unit comprises an opening in the weighing platform 2 intended in use to accommodate the driven wheel 7.2, for example.

The control module 14 advantageously comprises:
an input 14.1 configured to generate control signals for controlling the ground rolling unit 7,
a display unit 14.3 configured to display the position of each weighing device 1 on the basis of the signals represented above the position of each weighing device 1,
a communication unit 14.5 configured to send the control signals for controlling the ground rolling unit 7 and the control signals for controlling the actuating module 6.2 of the chocking unit 6 and to receive the signals representing the geographical position of each weighing device 1 and video signals representing the image.

According to another particular feature, the control module 14 comprises an input unit 14.2 configured to generate control signals for controlling the actuating module 6.2 of the chocking unit 6 of at least one weighing device 1. These control signals are received by the actuating module 6.2 of the chocking unit via the communication unit 3 of the weighing device or devices 1.

The control signals generated by the input module 14.1 of the control module 14 are transmitted to the motor module 7.3, to the steering module 7.4 and/or to the braking module of at least one weighing device 1 via the communication unit 3 of the weighing device or devices 1.

According to each variant, the communication unit 3 transmits a chocking confirmation signal to a display unit 17 of the aircraft AC or to a display unit of a user device 15 in order to display the confirmation of chocking of the aircraft.

Sending a chocking signal that confirms the chocking of the aircraft AC makes it possible to reduce the requirement for personnel to place the chocks 6.1. This also makes it possible to reduce the turnaround time (TRT) by thirty seconds to one minute.

In one particular variant, the weighing device 1 comprises at least one imaging unit 10. Each imaging unit 10 can be disposed so that all the fields of the imaging units 10 cover an angle of 360° and therefore all directions liable to be taken by the weighing device 1.

According to one variant, the imaging unit 10 is installed on a device rotatable about a vertical axis (not shown).

According to another variant, the device 1 comprises a plurality of imaging units 10 disposed so that the imaging direction of one imaging unit 10 is perpendicular to the imaging direction of another imaging unit 10. For example, the weighing device 1 comprises at least three imaging units 10 disposed on at least three faces of the cabinet 20.

Each imaging unit 10 is able to generate a video signal representing an image.

For example, the imaging unit 10 comprises a charge-coupled device (CCD) video camera.

The video signal representing an image from at least one weighing device 1 is transmitted to the control module 14 via the communication unit 3 of the weighing device or devices 1.

The control module 14 then comprises a display unit 14.4 configured to display video images on the basis of the video signals representing the image generated by each imaging unit 10.

According to one particular feature, the weighing device 1 comprises a positioning unit 11 adapted to generate signals representing the geographical position of the weighing device 1. The positioning unit 11 is included in the cabinet 20, for example.

The positioning unit 11 comprises a GPS (Global Positioning System) type satellite geolocation system, but this is not limiting on the invention.

The signals representing the geographical position of at least one weighing device 1 are transmitted to the control module 14 via the communication unit 3 of the weighing device or devices 1.

According to one variant, the control module 14 comprises a database in which is stored at least one value of the reference height corresponding to a height of a chock 6.1 above the weighing platform 2. The database comprises a plurality of reference heights, for example, each reference height being associated with a type of aircraft AC.

According to one variant, the connection between the communication unit 3 of each weighing device 1 and the communication unit of the control module 14 is a wired connection. According to another variant, this connection is electromagnetic.

It is then possible to control remotely the position of one weighing device 1 relative to another one. This facilitates the placement of the weighing devices 1 in a configuration corresponding to the positions of the undercarriage legs 5 of the aircraft AC.

The weighing device 1 as described above can be used in a system for determining the weight and the center of gravity of an aircraft AC, referred to hereinafter as a "determination system".

Figure 5:
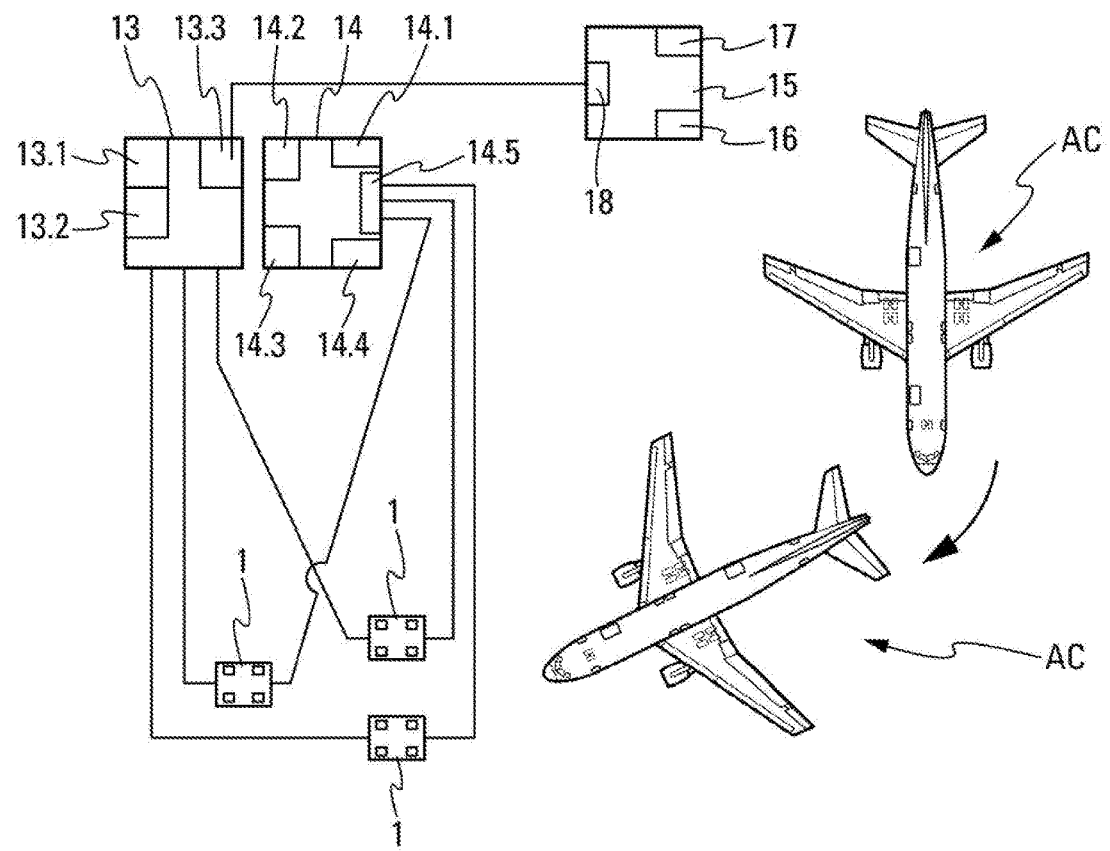
FIG. 5 is a view from above of one embodiment of the system for determining the weight and the center of gravity of an aircraft and an aircraft approaching the system.
Figure 6:
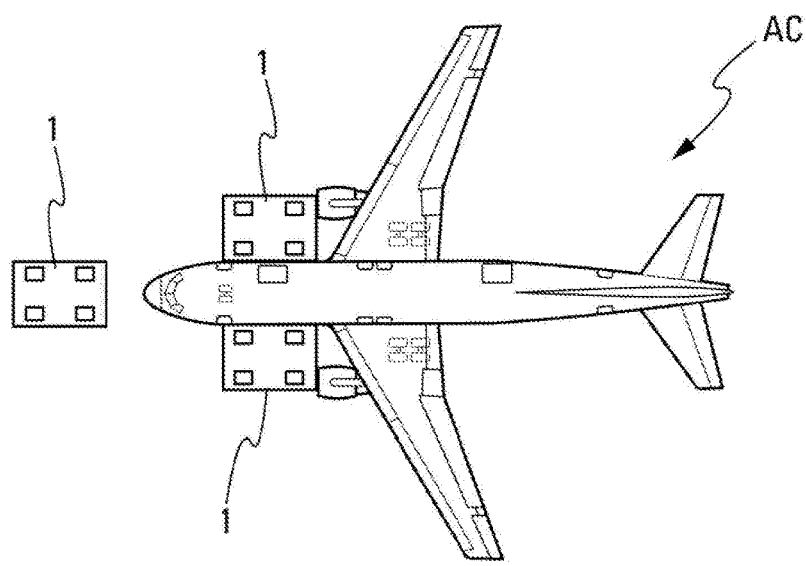
FIG. 6 is a view from above of the system for determining the weight and the center of gravity of an aircraft the undercarriage legs of which are on the point of being positioned on the weighing devices.

As shown in FIG. 5, the weight determination system comprises at least one weighing device 1 as described above and a central device 13 configured to determine the weight of the aircraft AC and the position of the center of gravity of the aircraft AC.

The determination system also comprises a user device 15 configured to receive a signal representing the weight of the aircraft AC and a signal representing the position of the center of gravity of the aircraft AC.

Figure 7:
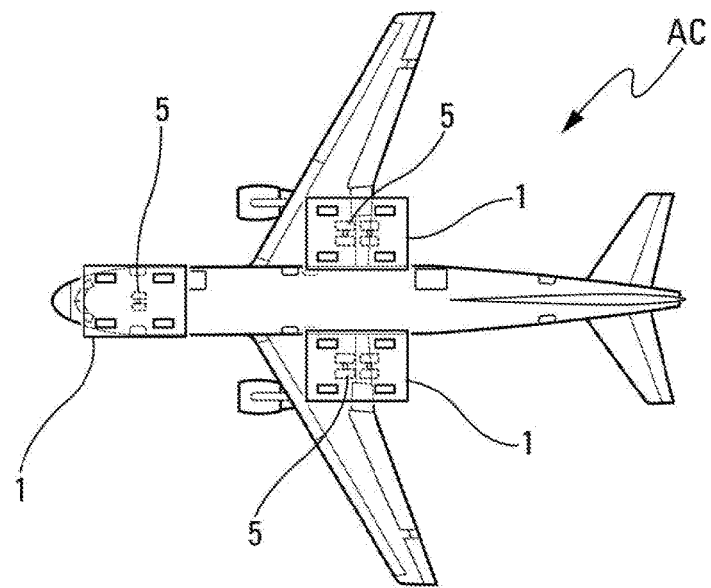
FIG. 7 is a view from below of the system for determining the weight and the center of gravity of an aircraft the undercarriage legs of which are disposed on the weighing devices.
Figure 8:
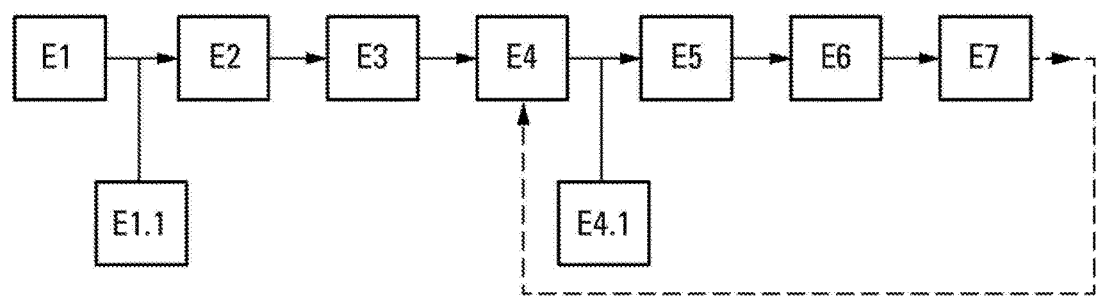
FIG. 8 is a flowchart of the method of using the system for determining the weight and the center of gravity of an aircraft.

The determination system preferably comprises three weighing devices 1. Each weighing device 1 is intended to receive an undercarriage leg 5 of an aircraft AC, as shown in FIG. 7.

According to one embodiment, the central device 13 comprises (see FIG. 5):
- a memory 13.1 storing a database listing aircraft dimensional characteristics, for example aircraft reference weights,
- a calculation unit 13.2 configured to calculate the weight and a position of the center of gravity of the aircraft AC from, on the one hand, the weighing information transmitted by each weighing device 1 and, on the other hand, dimensional characteristics of the aircraft AC extracted from the database,
- a communication unit 13.3 configured to transmit to a user device a signal representing the weight of the aircraft AC and a signal representing the position of the center of gravity of the aircraft AC calculated by the second calculation unit 13.2.

According to one particular embodiment, the user device 15 includes:
- a display unit 16 of the aircraft AC configured to display the weight of the aircraft AC and the center of gravity of the aircraft AC on the basis of the signal representing the weight of the aircraft AC and the signal representing the position of the center of gravity of the aircraft AC transmitted by the communication unit 13.3,
- a communication unit 18 of the aircraft AC configured to receive the chocking confirmation signal, the signal representing the weight of the aircraft AC and the signal representing the position of the center of gravity of the aircraft AC.

According to one particular feature, the user device 15 contains a display unit 17 of the aircraft AC configured to display a confirmation of the chocking of the aircraft AC on the basis of the chocking signal sent by the communication unit 3 of a weighing device 1 when the aircraft AC is chocked by the pair of chocks 6.1 of said weighing device 1.

According to one variant, the user device is installed in the cockpit of the aircraft AC.

According to another variant, the user device 15 consists of a display unit of an air traffic control center or an airport control center.

Likewise, the connection between the communication unit 3 of each weighing device 1 and a communication unit of the central device 13 is a wired connection or electromagnetic connection.

In a preferred embodiment, the system for determining the weight and the center of gravity of an aircraft AC as described above uses the following method.

Said method comprises, as shown in FIG. 9:
- a step E1 of prepositioning the weighing devices 1 at a geographical location where the aircraft AC is intended to stop, the number of weighing devices 1 having been defined beforehand on the basis of the number of undercarriage legs that have to be used to measure the weight,
- a step E2 of final positioning of the weighing devices 1 with the aid of the ground rolling unit 7 of each weighing device 1 controlled by the control module 14 in accordance with positions corresponding to the positions of the undercarriage legs 5 of the aircraft AC,
- a step E3 of rolling the aircraft AC onto the weighing devices 1,
- a step E4 of weighing the aircraft AC on the weighing platforms 2 of the weighing devices 1,
- a step E5 of determination of the weight and the position of the center of gravity of the aircraft AC by the central device 14,
- a step E6 of transmission to a user device 15 of a signal representing the weight of the aircraft AC and a signal representing the position of the center of gravity of the aircraft AC,
- a step E7 of display on a display unit 16 of the user device 15 of the weight of the aircraft AC and the position of the center of gravity of the aircraft AC.

The various steps E4 to E7 are advantageously carried out continuously from the sending of the chocking confirmation signal to the sending of the chocking exit signal.

In the step E2 of final positioning of the weighing devices 1, the control module 14 transmits to the weighing devices 1 control signals for controlling the ground rolling units 7. The control signals comprise the geographical position of each undercarriage leg 5 of the aircraft AC. Each geographical position is intended for a weighing device 1. The ground rolling units 7 of the weighing devices 1 controlled by the control module 14 position the weighing devices 1 according to the geographical positions contained in the control signals that correspond to the positions of the undercarriage legs 5 of the aircraft AC.

During the step E3 of rolling on the aircraft AC, each undercarriage leg 5 of the aircraft AC is placed on the weighing platform 2 of a weighing device 1. In the step E4 of weighing the aircraft AC the weighing platform 2 therefore generates for each undercarriage leg 5 weighing signals that depend on the pressure exerted by the undercarriage leg on the weighing platform 2. The calculation unit 4 of each weighing device 1 then calculates weighing information from the weighing signals. The communication unit of each weighing device 1 then sends the weighing information to the central device 13.

In the step E5 of determination of the weight and the position of the center of gravity, the calculation unit 13.2 of the central device 13 calculates the weight and the position of the center of gravity of the aircraft AC from, on the one hand, weighing information sent by the weighing devices 1 and, on the other hand, dimensional characteristics of the aircraft AC extracted from a database stored in a memory 13.1 of the central device 13.

A signal representing the weight of the aircraft AC and a signal representing the position of the center of gravity of the aircraft AC are then transmitted to a user device 15 by the communication unit 13.3 of the central device 13 during the transmission step E6. The signals then make possible a display of the weight and the position of the center of gravity of the aircraft on a display unit 16 of the user device 15.

According to one particular feature, the step E5 of determining the weight and the position of the center of gravity is preceded by a step E4.1 of chocking the undercarriage legs 5 of the aircraft AC on at least one weighing platform 2. Depending on the type of aircraft AC, some chocking units 6 are not controlled by their actuating modules 6.2 to chock the undercarriage leg 5 of their weighing device 1. For example, for some aircraft AC the chocking unit 6 of the weighing device 1 which is intended for the front undercarriage leg 5 of the aircraft AC is not actuated by the actuating unit 6.2 of the weighing device 1.

According to another particular feature, the step E2 of final positioning of the weighing devices 1 is preceded by a step E1.1 of reception by the control module 14 of a signal representing the position of the undercarriage legs 5 of the aircraft AC.

For example, the signal representing the position of the undercarriage legs 5 is included in a set of signals representing the characteristics of the aircraft AC transmitted by an air traffic control center, the airport or the aircraft AC the weight and the center of gravity of which are being determined.

The method also comprises a step of evacuation of the aircraft from the weighing devices 1. According to one embodiment of the method, the system comprises two weighing devices 1 each intended to receive the two main undercarriage legs 5 and a weighing device 1 intended to receive the front undercarriage leg 5. The weighing device 1 intended to receive the front undercarriage leg 5 of the aircraft AC is removed to be able to attach said front undercarriage leg to a towing vehicle. The aircraft AC can then be evacuated from the weighing devices 1 intended to receive the main undercarriage legs 5. The towing vehicle can be a vehicle with or without a towbar.

Using the device, system and method described above it is therefore possible to track the position of the center of gravity of an aircraft AC, to avoid the risks of tail-tipping and to identify any discrepancies at an early stage, with the aim of sending an alert.

Likewise, after intervention on the aircraft AC, when technical vehicles used for that intervention have been moved away, the aircraft AC will be in a rolling configuration. Automated final verifications and performance calculations can be effected using the real weight of the aircraft AC.

Moreover, the system and the method make it possible to obtain the real take-off weight of an aircraft AC and the position of the center of gravity during all operations on the aircraft AC.

The acquisition of a precise weight of an aircraft and more particularly of precise information as to the center of gravity makes it possible:
- to obtain an independent confirmation of the data of a load and trim sheet, which improves safety,
- to optimize the operation of the aircraft AC by reducing the safety margins in respect of the weight of the aircraft AC and its center of gravity; this brings greater flexibility for last minute changes,
- to be of particular benefit for airports that limit performance on take-off and for the use of cargo aircraft,
- for an airport to monitor the real damage caused by fatigue on aprons, taxiways and runways.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A weighing device for an aircraft comprising:
    a weighing platform configured to receive a undercarriage leg of the aircraft and to generate weighing signals;
    a first calculation unit configured to calculate weighing information from the weighing signals generated by the weighing platform;
    a first communication unit configured to transmit to a central device and to receive signals including at least one signal representing the weighing information calculated by the first calculation unit; and
    a ground rolling unit configured to move the weighing platform over a surface, the ground rolling unit comprising:
        at least one driving and steerable wheel adapted to be driven by a motor module and to be steered by a steering module; and
        at least one driven wheel;
        wherein the first communication unit is configured to receive from a control module control signals for controlling the ground rolling unit.

2. The device as claimed in claim 1, further comprising a chocking unit configured to chock the undercarriage leg of the aircraft on the weighing platform when the weighing device is positioned at the level of the undercarriage leg, the chocking unit comprising:
    a pair of chocks; and
    a module for actuating the pair of chocks configured to control the movements of the pair of chocks so that the undercarriage leg of the aircraft is chocked between the chocks,
    wherein the first communication unit is configured to receive from a control module control signals for controlling the module for actuating the pair of chocks, the first communication unit being also configured to send a chocking confirmation signal when the aircraft is chocked by the pair of chocks.

3. The device as claimed in claim 1, further comprising a set of foldable ramps configured to allow access of the undercarriage leg of the aircraft to the weighing platform, the set of foldable ramps being also configured to allow the undercarriage leg of the aircraft to exit the weighing platform.

4. The device as claimed in claim 1, wherein the weighing platform comprises a matrix of load cells, each load cell configured to generate and to transmit a weighing signal to the first calculation unit.

5. The device as claimed in claim 1, further comprising at least one imaging unit, each imaging unit being configured to generate a video signal representing an image, the first communication unit being adapted to send video signals representing the image generated by each imaging unit.

6. The device as claimed in claim 1, further comprising a positioning unit configured to generate signals representing the position of the weighing device, the first communication unit being adapted to send signals representing the position of the weighing device.

7. The device as claimed in claim 1, further comprising a unit for determining environmental parameters configured to generate signals representing the environmental parameters of the position where the weighing device is liable to be located, the environmental parameter determination unit being configured to transmit to the first calculation unit the signals representing the environmental parameters, the first calculation unit incorporating the signals into the calculation of the weighing information.

8. The device as claimed in claim 1, further comprising a control module, said control module comprising:
    a first input unit configured to generate control signals from controlling the ground rolling unit of the weighing device;
    a second input unit configured to generate control signals for controlling the module for actuating the pair of chocks of the weighing device;
    a first display unit configured to display the position of the weighing device on the basis of the signals representing the position of the weighing device sent by the first communication unit; and
    a second communication unit configured to send the control signals for controlling the ground rolling unit and the control signals for controlling the module for actuating the pair of chocks and configured to receive the signals representing the position of the weighing device.

9. The device as claimed in claim 1, further comprising a second display unit configured to display video images on the basis of the video signals representing an image generated by the imaging unit or units of the weighing device.

10. A system for determining the weight and the center of gravity of an aircraft, the system comprising:
    at least one weighing device comprising:
        a weighing platform configured to receive a undercarriage leg of the aircraft and to generate weighing signals;
        a first calculation unit configured to calculate weighing information from the weighing signals generated by the weighing platform;
        a first communication unit configured to transmit to a central device and to receive signals including at least one signal representing the weighing information calculated by the first calculation unit; and
        a ground rolling unit configured to move the weighing platform over a surface, the ground rolling unit comprising:
            at least one driving and steerable wheel adapted to be driven by a motor module and to be steered by a steering module; and
            at least one driven wheel;
        wherein the first communication unit is configured to receive from a control module control signals for controlling the ground rolling unit,
    the system further comprising:
        a central device configured to determine the weight of the aircraft and the position of the center of gravity of the aircraft; and
        a user device configured to receive a signal representing the weight of the aircraft and a signal representing the position of the center of gravity of the aircraft.

11. The system as claimed in claim 10, wherein the central device comprises:
    a memory storing a database listing aircraft dimensional characteristics;
    a second calculation unit configured to calculate the weight and a position of the center of gravity of the aircraft on the basis of, on the one hand, weighing information transmitted by each weighing device and, on the other hand, dimensional characteristics of the aircraft extracted from the database; and
    a third communication unit configured to transmit to the user device a signal representing the weight of the aircraft and a signal representing the position of the center of gravity of the aircraft calculated by the second calculation unit.

12. The system as claimed in claim 10, wherein the user device comprises:
    a fourth communication unit of the aircraft configured to receive a chocking confirmation signal, a signal representing the weight of the aircraft and a signal representing the position of the center of gravity of the aircraft; and
    a third display unit of the aircraft configured to display the weight of the aircraft and the center of gravity of the aircraft on the basis of the signal representing the weight of the aircraft and the signal representing the position of the center of gravity of the aircraft transmitted by the third communication unit; and
    a fourth display unit of the aircraft configured to display a confirmation of the chocking of the aircraft on the basis of the chocking confirmation signal sent by a first communication unit of a weighing device.

13. A method of using the system as claimed in claim 10 for determining the weight and the center of gravity of an aircraft, the method comprising:
    pre-positioning weighing devices at a location where the aircraft is intended to stop, the number of weighing devices having been defined beforehand on the basis of the number of undercarriage legs to be used to measure the weight;
    final positioning of the weighing devices with the aid of a ground rolling unit of each weighing device controlled by a control module according to positions corresponding to the positions of the undercarriage legs of the aircraft;
    rolling the aircraft onto the weighing devices;
    weighing the aircraft on weighing platforms of the weighing devices;

determining the weight and the position of the center of gravity of the aircraft by a central device; and transmitting to a user device of a signal representing the weight of the aircraft and a signal representing the position of the center of gravity of the aircraft; and displaying on a display unit of the user device the weight of the aircraft and the position of the center of gravity of the aircraft.

14. The method as claimed in claim 13, wherein the determining the weight and the position of the center of gravity is preceded by chocking the undercarriage legs of the aircraft on at least one weighing platform.

15. The method according to claim 13, wherein the final positioning of the weighing devices is preceded by receiving by the control module of a signal representing the position of the undercarriage legs of the aircraft.

* * * * *